No. 680,358. Patented Aug. 13, 1901.
J. D. RICHARDS.
AUTOMATIC VEHICLE BRAKE.
(Application filed Mar. 27, 1901.)
(No Model.) 2 Sheets—Sheet 1.
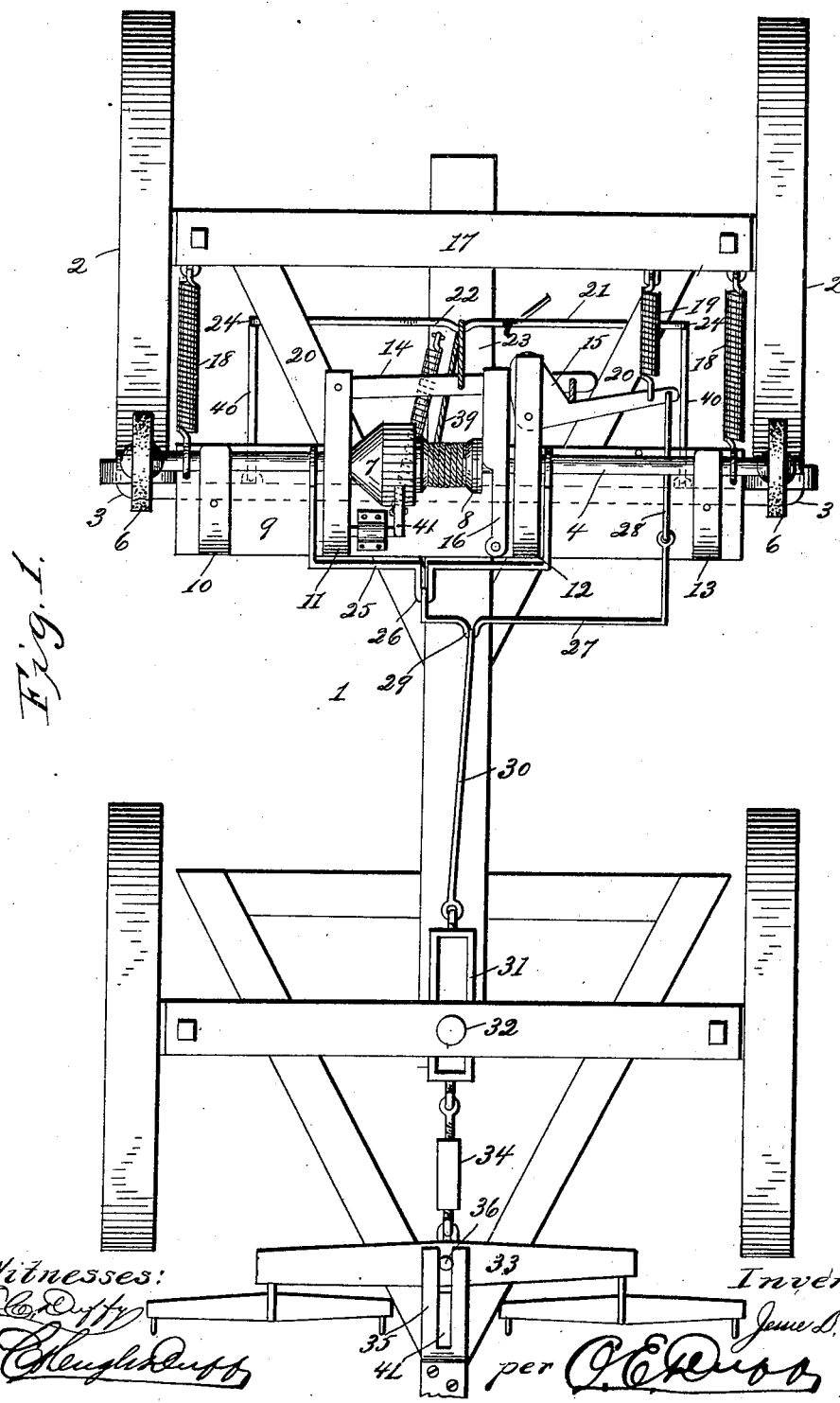

No. 680,358. Patented Aug. 13, 1901.
J. D. RICHARDS.
AUTOMATIC VEHICLE BRAKE.
(Application filed Mar. 27, 1901.)
(No Model.) 2 Sheets—Sheet 2.
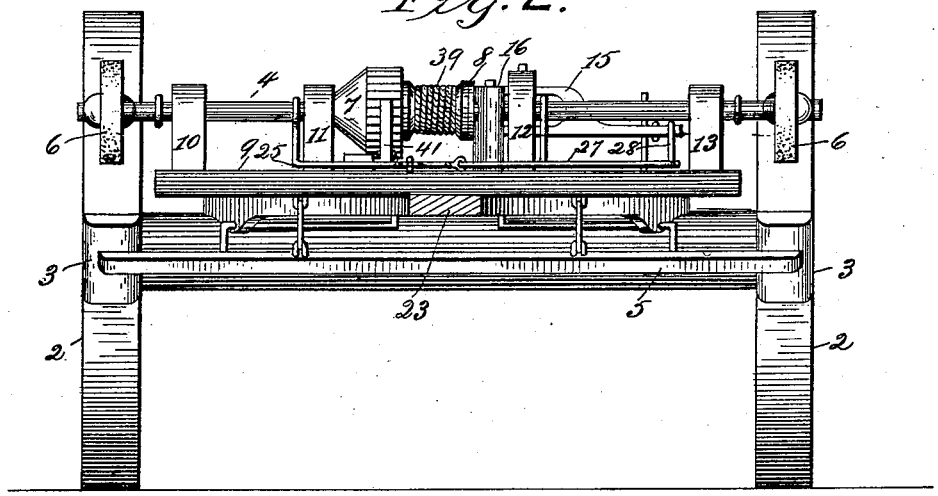
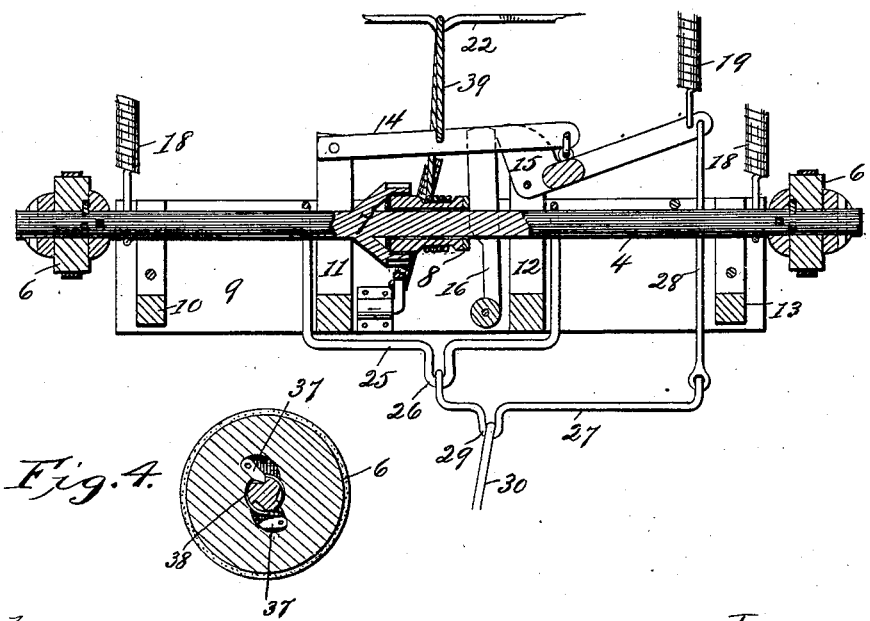
Witnesses:
Inventor
Jesse D. Richards
per O. E. Duss
Att'y

UNITED STATES PATENT OFFICE.

JESSE D. RICHARDS, OF WABASH, INDIANA, ASSIGNOR OF ONE-HALF TO EDWARD GILLENWATER AND EBER BAKER, OF SIMS, INDIANA.

AUTOMATIC VEHICLE-BRAKE.

SPECIFICATION forming part of Letters Patent No. 680,358, dated August 13, 1901.

Application filed March 27, 1901. Serial No. 53,035. (No model.)

*To all whom it may concern:*

Be it known that I, JESSE D. RICHARDS, a citizen of the United States, residing at Wabash, in the county of Wabash and State of Indiana, have invented certain new and useful Improvements in Automatic Vehicle-Brakes; and I do hereby declare the following to be a full, clear, and exact description of the invention, such as will enable others skilled in the art to which it appertains to make and use the same.

My invention relates to vehicles, and has for its object to provide an automatic vehicle-brake.

A further object of my invention is to provide a vehicle-brake particularly adapted to be used on large trucks or wagons and which is designed to be operated when the draft is off and which is entirely independent of the driver of the truck.

With these objects in view my invention consists in the novel construction and combination of parts, which will be hereinafter fully described and afterward specifically pointed out in the appended claims.

Referring to the accompanying drawings, Figure 1 is a top plan view of a vehicle-truck provided with my invention. Fig. 2 is a front elevation of my improved brake attached to a wagon-truck. Fig. 3 is a top plan view of my braking apparatus, the clutch mechanism being shown in section. Fig. 4 is a section through one of the cylindrical pulleys.

Like numerals of reference indicate the same parts throughout the several figures, in which—

1 is a wagon-truck, and 2 the wheels.

3 indicates the ordinary swinging brake-shoes.

4 is a cross-rod, of iron or other strong material, above the ridge-pole and directly over the swinging rod 5, to which the brake-shoes 3 are attached.

6 indicates cylindrical pulleys journaled on the ends of the cross-bar 4.

A little to the right of the center of the cross-rod 4 is a hollow cone-shaped ratchet-wheel 7, permanently secured to the cross-rod 4. 8 is a spool loosely journaled on said cross-rod 4, one end of said spool fitting snugly within the hollow cone-shaped ratchet-wheel 7 and forming a friction-clutch, as shown in Fig. 3.

Secured to the ridge-pole is a platform 9, carrying the slotted upright supports 10, 11, 12, and 13, within which the cross-bar 4 is held. Secured in the end of the slotted upright support 11 is a lever-arm 14, which is connected to the cam-lever 15, which is secured in the end of the slotted upright support 12. Between said slotted upright support 12 and the spool 8 is a pivoted slotted lever 16, which is adapted to press the spool 8 into the hollow ratchet-wheel 7, thereby forming a friction-clutch. Said pivoted slotted upright 16 is operated by the cam-lever 15 in a manner which will be hereinafter fully described.

Secured to the bolster 17 are springs 18, which connect with the cross-rod 4, and also a spring 19, which connects with the arm of the cam-lever 15. Secured under the hounds 20 is a rock-shaft 21, having a yoke 22, which straddles the ridge-pole 23, the ends of said shaft projecting downwardly at 24. Secured to the cross-rod 4 on either side of the slotted upright supports 11 and 12 is a yoke 25, having a forwardly-projecting loop 26. Secured to said loop 26 is a looped rod 27, which connects with the cam-lever arm 15 by means of a connecting-rod 28. Secured in the loop 29 of the looped rod 27 is the main connecting-rod 30, said loop 29 being formed very much closer to the inner end of the looped rod 27 than to the outer end thereof. Said main connecting-rod 30 is secured to a link 31, which straddles the king-pin 32. The whiffletree 33 is connected to said link 31 by means of a turnbuckle 34 and is secured to the wagon-tongue by means of a slotted guide-iron 35, within which the pin 36 of the whiffletree is secured.

The cylindrical pulleys 6 are provided around their periphery with rubber or other material which increases the friction between the pulleys and the rear wheels. Secured within said cylindrical pulleys are two pawls 37, and the cross-rod 4 is provided with three notches or ratchet-teeth 38, which engage said pawls. This allows said cylindrical pulleys to turn freely on the cross-rod 4 in one direction, but in the contrary direction the cross-rod 4 must turn with said cylindrical pulleys, as is obvious.

Connected to the lever-arm 14 is a cable 39, of steel or other strong material, which is carried over the yoke 22 of the rock-shaft 21 and back to the spool 8, around which it is permanently secured.

Connecting the swinging brake-shoe rod 5 with the downwardly-projecting ends 24 of the rock-shaft 21 are the connecting-rods 40. Secured to the platform 9 is a pawl 41, which engages the cone-shaped ratchet-wheel 7.

Having thus described the several parts of my invention, its operation is as follows: When there is a draft on the whiffletree 33, said whiffletree is drawn forward until the pin 36 engages the end of the slot 42 in the slotted guide-iron 35, and the whiffletree being connected to the cross-bar 4, which carries the cylindrical pulleys 6, by the connections as described said cross-bar and pulleys are pulled out of engagement with the rear wheels. As long as there is a draft on the whiffletree said cylindrical pulleys are held in this position; but as soon as the wagon strikes a downgrade, or, in fact, as soon as the horses cease to pull, the cylindrical pulleys 6 are drawn into engagement with the rear wagon-wheels by means of the springs 18. Just as soon as the cylindrical pulleys are in contact with the wagon-wheels they begin to revolve, the pawls 37 in the interior thereof engage the notches 38 in the cross-bar 4, and said cross-bar is turned with the cylindrical pulleys in the same manner as though the cross-bar and pulleys were permanently secured together. The spring 19 pulls the cam-lever so as to press the pivoted slotted lever 16 firmly against the spool 8. This holds said spool securely within the cone-shaped hollow ratchet-wheel, forming a friction-clutch between the two. Said hollow cone-shaped ratchet-wheel, being permanently secured to the cross-bar 4, turns with said bar, and as the ratchet-wheel forms a friction-clutch with the spool 8 said spool is also turned with said bar and cylindrical pulleys. This winds the cable upon said spool and draws forward on the loop 22 of the rock-shaft 21, and as the ends 24 of said rock-shaft project downwardly this forward motion of the loop 22 of the rock-shaft 21 moves the downwardly-projecting ends 24 backwardly, and as said ends are connected to the swinging brake-shoes 3 by means of the connecting-rods 40 said brake-shoes are drawn into engagement with the rear wagon-wheels. As the cylindrical pulleys continue to revolve the brakes are drawn tighter and tighter against the wheels, and in order to increase the friction between the spool 8 and the hollow cone-shaped ratchet-wheel 7 I have, as described, connected the other end of the cable to the lever-arm, which lever-arm connects with the cam-lever 15. Thus it will be seen that the tighter the cable is wound on the spool 8 the more firmly the cam 15 pushes the pivoted slotted lever 16 against said spool, which jams said spool more firmly into the hollow cone of the ratchet-wheel 7, thus increasing the friction of the clutch directly as the strain on the spool is increased.

Having thus described the operation of my invention, I do not wish to be understood as limiting myself to the exact construction as herein set forth, as various slight changes might be made therein which would fall within the limit and scope of my invention, and I consider myself entitled to all such changes and modifications.

What I claim as new, and desire to secure by Letters Patent of the United States, is—

1. In an automatic vehicle-brake, the combination with a vehicle-truck of a longitudinally-moving whiffletree, cylindrical pulleys, means for connecting said cylindrical pulleys and whiffletree, a cross-rod adapted to carry said pulleys, a friction-clutch on said cross-rod, brake-shoes adapted to be operated by the revolution of said clutch through intermediate mechanism, and means for throwing said clutch in and out of engagement, substantially as described.

2. In an automatic vehicle-brake, the combination with a vehicle-truck of a longitudinally-moving whiffletree, cylindrical pulleys, means for connecting said cylindrical pulleys and whiffletree, pawls secured within said pulleys, a cross-rod adapted to carry said pulleys, ratchet-teeth in said cross-rod, adapted to be engaged by said pawls, a friction-clutch, brake-shoes adapted to be operated by said friction-clutch through intermediate mechanism, and means for operating the whole, substantially as described.

3. In an automatic vehicle-brake, the combination with a vehicle-truck, of vehicle-wheels, cylindrical pulleys adapted to engage the tread of the same, a friction-clutch operated by said pulleys, a spool connected to said clutch, brake-shoes adapted to be operated by said clutch, through intermediate mechanism, and means for increasing the friction of said clutch directly as the power of the brakes is increased, substantially as described.

In testimony whereof I affix my signature in presence of two witnesses.

JESSE D. RICHARDS.

Witnesses:
L. A. KING,
CHARLES FLINN.